United States Patent
Bucci et al.

(10) Patent No.: US 9,836,280 B2
(45) Date of Patent: Dec. 5, 2017

(54) ARRANGEMENT AND METHOD FOR CHECKING THE ENTROPY OF A RANDOM NUMBER SEQUENCE

(71) Applicant: Infineon Technologies AG, Neubiberg (DE)

(72) Inventors: Marco Bucci, Graz (AT); Raimondo Luzzi, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 74 days.

(21) Appl. No.: 15/045,277

(22) Filed: Feb. 17, 2016

(65) Prior Publication Data
US 2016/0246573 A1    Aug. 25, 2016

(30) Foreign Application Priority Data
Feb. 19, 2015    (DE) ........................ 10 2015 102 363

(51) Int. Cl.
G06F 7/58    (2006.01)

(52) U.S. Cl.
CPC .................................... *G06F 7/584* (2013.01)

(58) Field of Classification Search
CPC ....................................................... G06F 7/584
USPC ................................................. 708/250–256
See application file for complete search history.

(56) References Cited

U.S. PATENT DOCUMENTS

| | | | |
|---|---|---|---|
| 7,720,896 B2 | 5/2010 | Luzzi et al. | |
| 2004/0039762 A1* | 2/2004 | Hars | G06F 7/588 708/255 |
| 2004/0049525 A1* | 3/2004 | Hars | G06F 7/584 708/250 |
| 2007/0244950 A1* | 10/2007 | Golic | G06F 7/582 708/250 |

(Continued)

FOREIGN PATENT DOCUMENTS

| | | |
|---|---|---|
| DE | 102007025754 A1 | 12/2007 |
| EP | 1662375 B1 | 1/2008 |

OTHER PUBLICATIONS

Killmann et al.: "A proposal for: Functionality classes for random number generators", Sep. 18, 2011, version 2.0.
(Continued)

*Primary Examiner* — Tan V. Mai
(74) *Attorney, Agent, or Firm* — Viering, Jentschura & Partner mbB

(57) ABSTRACT

According to one embodiment, an arrangement for checking the entropy of a random number sequence is described including a random source configured to provide a random input sequence, a post-processing circuit configured to receive the random input sequence and to generate a random number sequence from the random input sequence by performing a post-processing and a decimation of the random input sequence, an inverse post-processing circuit configured to receive the random number sequence from the post-processing circuit and to generate a processed random number sequence by a processing of the random number (Continued)

sequence that is inverse to the post-processing performed by the post-processing circuit, and an entropy checker configured to check the entropy of the random number sequence based on the processed random number sequence.

20 Claims, 12 Drawing Sheets

(56) References Cited

U.S. PATENT DOCUMENTS

2007/0282934 A1  12/2007  Luzzi et al.

OTHER PUBLICATIONS

Bucci et al.: "Design of Testable Random Bit Generators", 7th International Workshop on Cryptographic Hardware and Embedded Systems (CHES 2005), Lecture Notes on Computer Science, 2005, vol. 3659, pp. 147-156, Springer Berlin Heidelberg.

Bucci et al.: "Digital post-processing for testable random bit generators", 18th European Conference on Circuit Theory and Design (ECCTD), 2007, pp. 623-626, IEEE.

Fischer: "A closer look at security in random number generators design", Third International Workshop on Constructive Side-Channel Analysis and Secure Design (COSADE), 2012, vol. 7275, pp. 167-182, Springer Berlin Heidelberg.

Fischer et al. "True random number generators in FPGAs", Security Trends for FPGAS, 2011, pp. 101-135, Springer Netherlands.

* cited by examiner

ARRANGEMENT AND METHOD FOR CHECKING THE ENTROPY OF A RANDOM NUMBER SEQUENCE

CROSS-REFERENCE TO RELATED APPLICATION

This application claims priority to German Patent Application Serial No. 10 2015 102 363.6, which was filed Feb. 19, 2015, and is incorporated herein by reference in its entirety.

TECHNICAL FIELD

The present disclosure relates to arrangements and methods for checking the entropy of a random number sequence.

BACKGROUND

Random numbers are often needed in electronic devices, such as chip cards, for example for cryptographic applications. When a sequence of random numbers is generated, an important quality indication of the sequence is its entropy since only high entropy ensures high security, e.g. ensures that an attacker cannot guess random numbers of the sequence. Accordingly, approaches to allow checking the entropy of a generated random number sequence are desirable.

SUMMARY

According to one embodiment, an arrangement for checking the entropy of a random number sequence is provided including a random source configured to provide a random input sequence, a post-processing circuit configured to receive the random input sequence and to generate a random number sequence from the random input sequence by performing a post-processing and a decimation of the random input sequence, an inverse post-processing circuit configured to receive the random number sequence from the post-processing circuit and to generate a processed random number sequence by a processing of the random number sequence that is inverse to the post-processing performed by the post-processing circuit and an entropy checker configured to check the entropy of the random number sequence based on the processed random number sequence.

According to a further embodiment, a method for checking the entropy of a random number sequence according to the arrangement described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
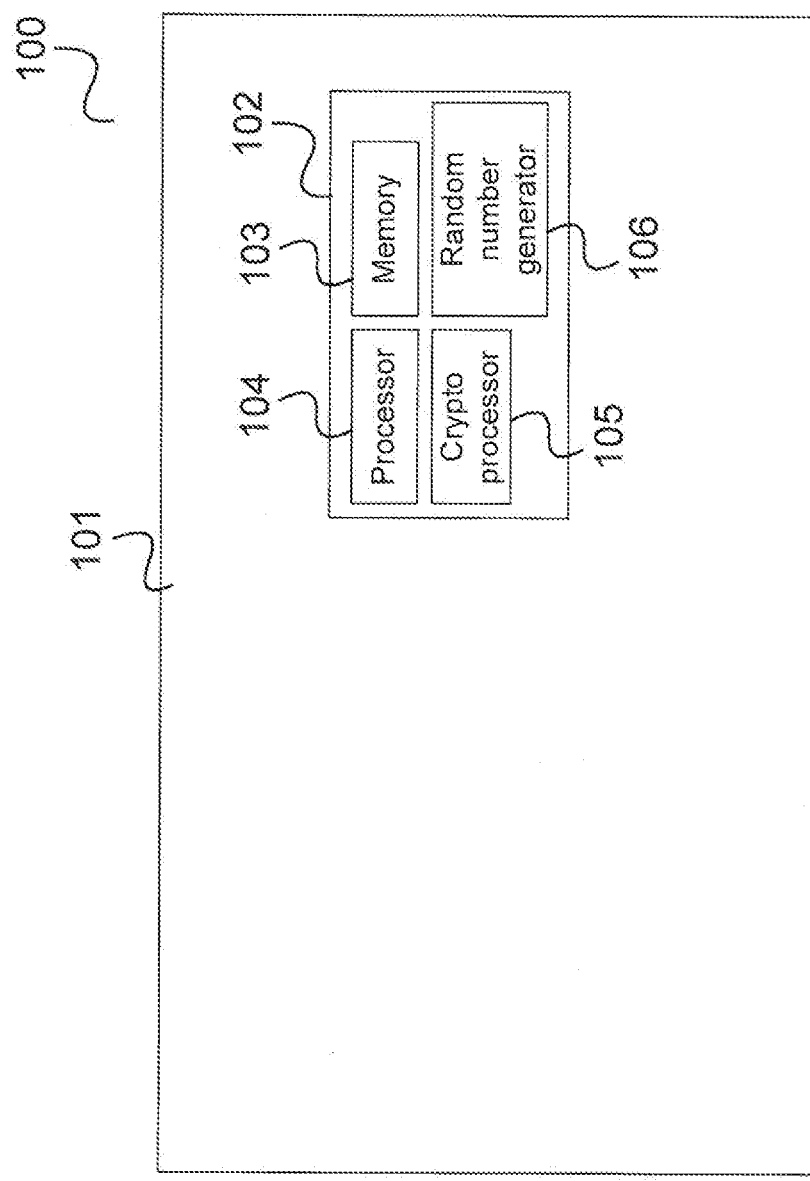
FIG. 1 shows a chip card according to an embodiment.

FIG. 1 shows a chip card 100 according to an embodiment.

The chip card 100 includes a carrier 101 on which a chip card module 102 is arranged. The chip card module 102 includes various data processing components like for example a memory 103, a processor 104 or for example a dedicated crypto processor 105.

The chip card module 103 includes a random number generator 106. The random number generator may for example supply a random number sequence to the processor 104 or the crypto processor which may for example perform a cryptographic operation based on the random number sequence.

Figure 2:
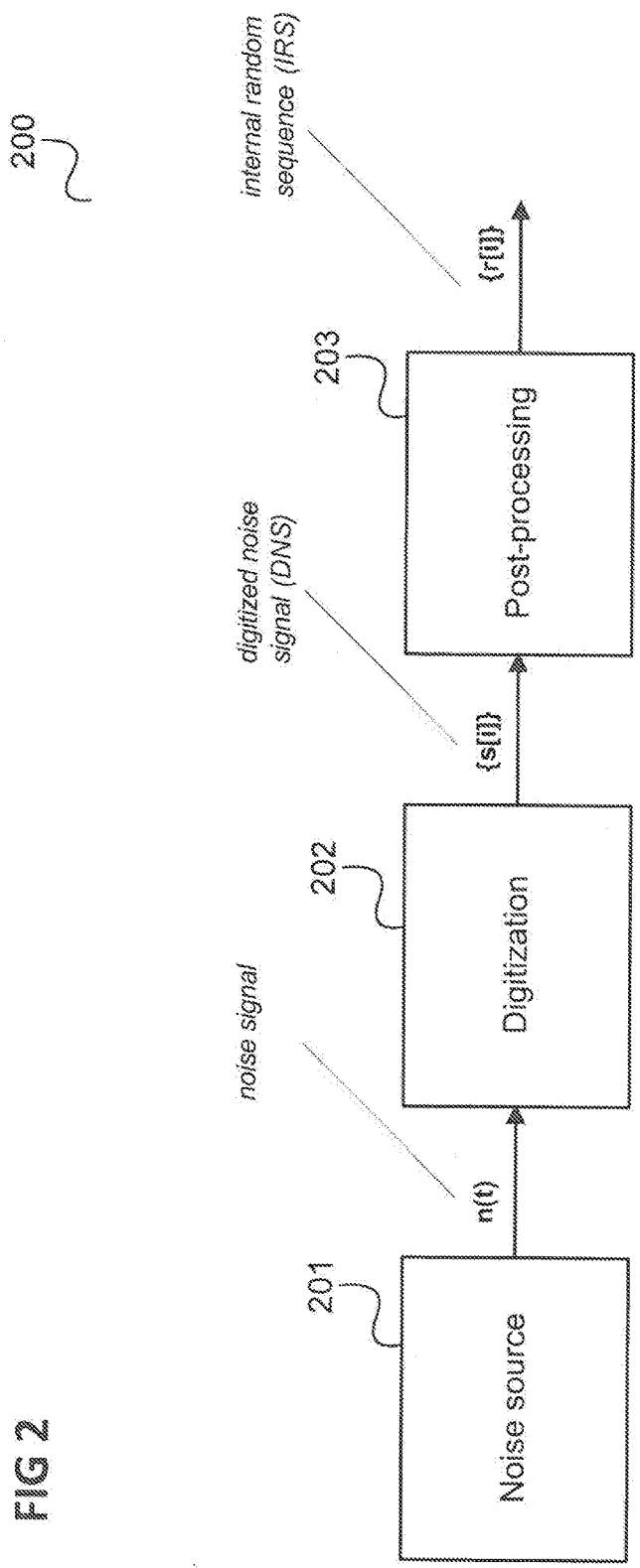
FIG. 2 shows an example of an architecture of a random number generator.

FIG. 2 shows an example of an architecture of a random number generator 200.

The random number generator 200 includes a noise source 201 which is configured to output a noise signal n(t). The noise source 201 for example has a certain entropy and no or short memory. A digitization unit of the random number generator 200 converts the noise signal to a digitized noise signal (DNS) {s[i]}, i.e. a sequence of digital noise values, e.g. by sampling the noise signal at a certain sample interval and digitizing the sample values. The random number generator 200 further includes a post-processor 203 which post-processes the digitized noise signal with a compressing digital algorithm (e.g. according to a hashing function, e.g. by means of a linear feedback shift register with decimated output) in order to obtain a full entropy random number sequence {r[i]}, also referred to as internal random sequence (IRS).

To ensure a sufficient level of security, for example, the entropy per bit of the random number sequence r[i] may be checked or tested. However, since the compression algorithm may have a long memory (e.g. may be implemented by a 32-bit LFSR), a direct entropy test of the internal random sequence {r[i]} may practically not be feasible since a too large amount of data would be required for the testing.

This can be seen by considering the definition of entropy rate or source information rate of a strongly stationary stochastic process:

$$H(X) = \lim_{n \to \infty} H(X_n \mid X_{n-1}, X_{n-1}, \ldots, X_1) \quad (1)$$

where $X_k$ is the k-th member of the process and $H(X|Y)$ is the conditional entropy. For a binary entropy source, the entropy rate is the entropy of the n-th bit knowing the previous n−1 bits.

H(X) can be calculated as:

$$H(X) = \lim_{n \to \infty} - \left[ \sum_{x_{n-1},x_{n-2},\ldots,x_1 \in X_{n-1},X_{n-2},\ldots,X_1} p(x_{n-1}, x_{n-2}, \ldots, x_1) \right.$$
$$\left. \sum_{x_n \in X_n} p(x_n \mid x_{n-1}, x_{n-2}, \ldots, x_1) \log p(x_n \mid x_{n-1}, x_{n-2}, \ldots, x_1) \right] \quad (2)$$

where $p(x_{n-1}, x_{n-2}, \ldots, x_1)$ is the probability of the output bit sequence $(x_{n-1}, x_{n-2}, \ldots, x_1)$ and $p(x_n|x_{n-1}, x_{n-2}, \ldots, x_1)$ is the conditional probability of the n-th symbol knowing the previous n−1 symbols.

Both probabilities can be estimated from the generated data sequences but, if the test if performed on the post-processed data ({r[i]} in this example), n needs to be larger than the memory of the post-processor 203 (e.g. 32 bits in case of a 32-bit LFSR) in order to obtain the entropy rate of the compressed source. For smaller n, the test would be deceived by the pseudo-randomness introduced by the post-processor 203. For e.g. a 32 bit memory depth, the estimation of the probabilities defined above is not practically feasible.

Figure 3:
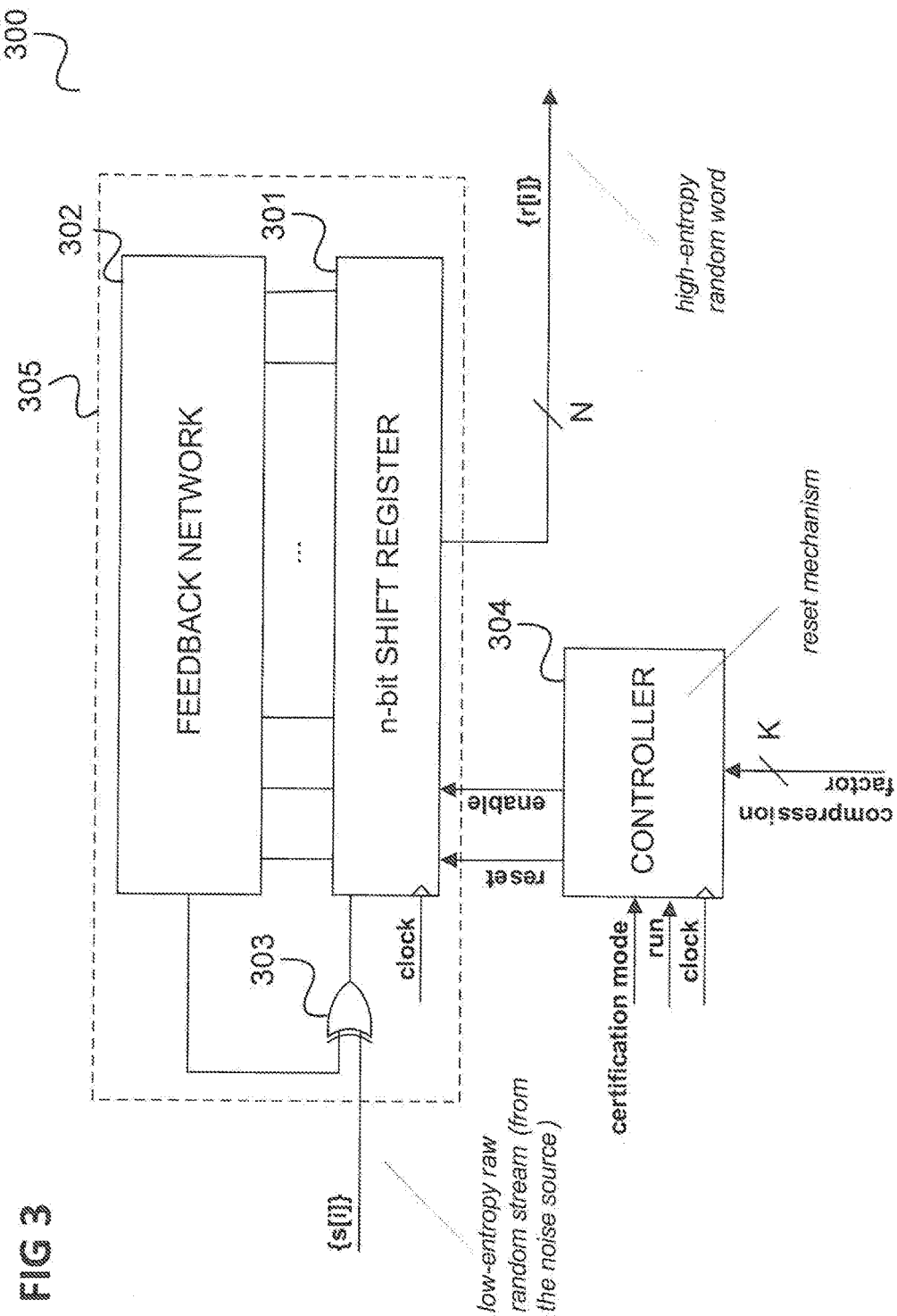
FIG. 3 shows an example for a post-processor.

FIG. 3 shows an example for a post-processor 300.

The post-processor or post-processing unit (e.g. circuit) 300 is based on a linear feedback shift register (LFSR) 305 with a length of n bits including a linear shift register 301, a feedback network 302 and an exclusive OR gate 303. The post-processor 300 receives as input a stream of random bits {s[i]} (e.g. provided by the digitization unit 202) and outputs an random number sequence {r[i]} in the form of a sequence of N-bit words. The stream of random bits {s[i]} consists of a stream of bits having one of the values 0 and 1. The stream of random bits {s[i]} is for example of a relatively low entropy per bit and is for example provided at a high rate to the post-processor 300. The random bits of the stream of random bits can be seen to serve as seeds for the post-processor 300.

The n-bit shift register 301 is connected to the feedback network 302 and the exclusive-OR gate 303 which receives the output of the feedback network 302 and the input stream {s[i]} as input and supplies its output to the n-bit shift register 301. The sift register 301 is clocked by a clock signal and includes n memory elements, e.g. is implemented as a chain of flip-flops. With each clock pulse of the clock signal the bit stored in each memory element is shifted to the neighboring memory element to the right (except the bit stored in the right-most memory element), wherein a new incoming bit output by the exclusive-OR gate 303 is shifted into the left-most memory element. The shift register 301 only performs this shift operation when an enable signal is applied to it by a controller 304 of the post-processor.

The controller 304 can reset the memory elements of the n-bit shift register 301 to predetermined values by applying a reset signal. The predetermined values may all have the same value, for example a logical "0" or "1". Alternatively the memory elements may be reset to values corresponding to a secret key or a manufacturing identification number. N bits of the n bits stored in the shift register 301 are output as a random word of the random number sequence {r[i]} for every K×N bits supplied to the n-bit shift register 301, wherein K is a compression factor fed to the controller 304. For example, the N bits which are output are the N leftmost bits stored in the n-bit shift register after K×N bits have been supplied to the n-bit shift register 301 (i.e. after every K×N clock cycles).

In every clock cycle of the clock signal, the feedback network 302 uses the values stored in the memory elements of the shift register 301 (at the start of the clock cycle) as inputs to calculate a feedback bit. The exclusive OR-gate 303 XOR-combines the feedback bit with the random bit incoming in this clock cycle and the result of this combination is used as input for the shift register 301.

Not all values stored in the memory elements need to be used in the calculation of the feedback bit which is for example calculated in accordance with a primitive feedback polynomial. The primitive feedback polynomial may for example be chosen so that the sequence of feedback bits has the maximum possible length before repeating itself if always the same random bit is input to the LFSR 305. The feedback network 302 can be seen to increase the randomness of the bits stored in the memory elements so that their probabilities are nearer to a uniform distribution.

The controller 304 controls the shift register 301 by the reset signal and the enable signal. The controller receives the clock signal, a certification mode signal, a run signal and the compression factor as inputs. The run signal is used for starting the post processor 302.

In normal mode of operation of the post processor 300 the memory elements of the shift register are not set to predetermined values before the generation of every random word. If the enable signal is applied to the shift register 301 a number K×N of random bits are post-processed before a random word is output. The number of K×N of random bits to be processed is determined by the compression factor K. The entropy of K×N random bits can thus be seen to be collected and compressed into an N bit random word. The normal mode of operation is selected by applying a low certification mode signal to the control unit.

In certification mode the memory elements of the shift register 301 are set to predetermined values before starting the generation of each random word. Then K×N random bits are post-processed and the resulting random word is formed. The random words are output, collected and tested according to a statistical test, e.g. based on equation (2) above.

Thus, assuming every K×N bits of a low entropy raw random stream from a noise source being compressed to random words in a n-bit LFSR to generate N-bit high-entropy random words as illustrated in FIG. 3, the entropy of the sequence {r[i]} can be directly measured if the LFSR is reset before starting a new compression. Actually, the reset operation ensures, under the assumption of a memory-less source, that the post-processed words are independent. Therefore, if N is small (e.g. 8 bits), the entropy can be measured simply by testing the flatness of the output distribution.

However, in this approach, the obtained estimated entropy is typically much too pessimistic: for instance, if n=32 and N=8, the reset operation destroys the entropy of the remaining 24-bits which are still in the LFSR after the extraction of an output byte. This means that in certification mode, the measured entropy is lower than the actual entropy achieved when in normal mode where there is no reset.

In the following, an embodiment is described which may for example allow measuring the entropy of a generated random number sequence in practical application while avoiding to be too pessimistic such as in the example described above with reference to FIG. 3.

Figure 4:
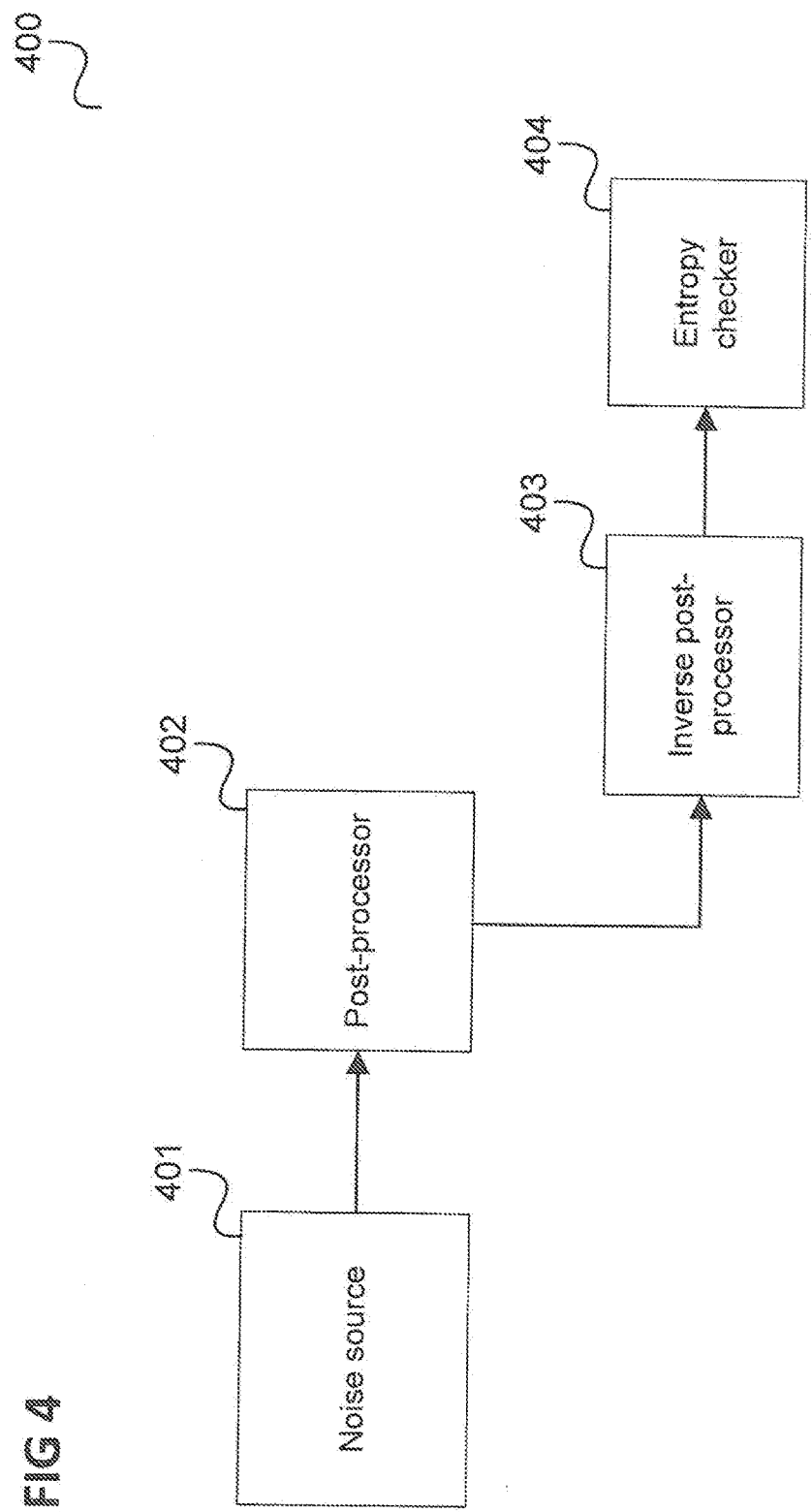
FIG. 4 shows an arrangement for checking the entropy of a random number sequence.

FIG. 4 shows an arrangement 400 for checking the entropy of a random number sequence.

The arrangement 400 includes a random source 401 configured to provide a random input sequence and a post-processing circuit 402 configured to receive the random input sequence and to generate a random number sequence from the random input sequence by performing a post-processing and a decimation of the random input sequence.

The arrangement 400 further includes an inverse post-processing circuit 403 configured to receive the random number sequence from the post-processing circuit 402 and to generate a processed random number sequence by a processing of the random number sequence that is inverse to the post-processing performed by the post-processing circuit.

Further, the arrangement 400 includes an entropy checker 404 configured to check the entropy of the random number sequence based on the processed random number sequence.

According to one embodiment, in other words, an inverse (or descrambling) post-processor performing an inverse operation of the post-processor processes the random number sequence before its entropy is tested. This for example allows removing the pseudo-randomness introduced by the post-processor and therefore allows measuring the entropy with a smaller depth compared to measuring the entropy of the random number sequence without the inverse post-processing.

This for example allows a direct test of the entropy rate of a post-processed (compressed) noise source. In addition, an online noise source total failure and an integrity test of the postprocessor can be easily implemented according to one embodiment.

The components of the arrangement (e.g. the post-processing circuit, the inverse post-processing circuit and the entropy checker) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

A register is for example implemented by means of a serial connection of memory elements such as flip-flops.

According to one embodiment, the decimation includes outputting a first number of post-processed bits for every second number of bits of the random input sequence input into the post-processing circuit.

The decimation is for example a compression of the random input sequence by a compression factor equal to a power of 2.

According to one embodiment, the post-processing circuit includes a linear feedback shift register and the post-processing is a processing of the random input sequence by the linear feedback shift register.

The decimation for example includes outputting a first number of bits stored in the linear feedback shift register each time after a second number of bits of the random input sequence have been input into the linear feedback shift register.

The ratio between the second number of bits and the first number of bits is for example given by a compression factor, i.e. corresponds to a, e.g. predetermined, compression factor.

The inverse post-processing circuit may for example include a further linear feedback shift register and the processing of the random number sequence that is inverse to the post-processing performed by the post-processing circuit is for example a processing of the random number sequence by the further linear feedback shift register.

For example, the linear feedback shift register and the further linear feedback shift register are configured according to the same primitive polynomial.

According to one embodiment, the random source includes a noise source and a digitization unit configured to generate the random input sequence by digitizing noise output by the noise source.

According to one embodiment, the entropy checker is configured to detect whether the entropy of the random number sequence is zero and, if it has detected that the entropy of the processed random number sequence is zero, to output a signal indicating that the random source has failed.

For example, the entropy checker is configured to detect whether the entropy of the processed random number sequence is zero by detecting whether the processed random number sequence is constant.

According to one embodiment, the arrangement further includes a controller configured to check the integrity of the post-processing circuit by checking whether the processed random number sequence is constant in response to a constant random input sequence.

According to one embodiment, the entropy checker is configured to measure the entropy of the random number sequence by measuring the entropy of the processed random number sequence.

The entropy checker may for example be configured to measure the entropy of the processed random number sequence by applying a statistical test to the processed random number sequence.

According to one embodiment, a processing device including the arrangement for checking the entropy of a random number sequence as described above is provided.

The processing device is for example a chip card.

Figure 5:
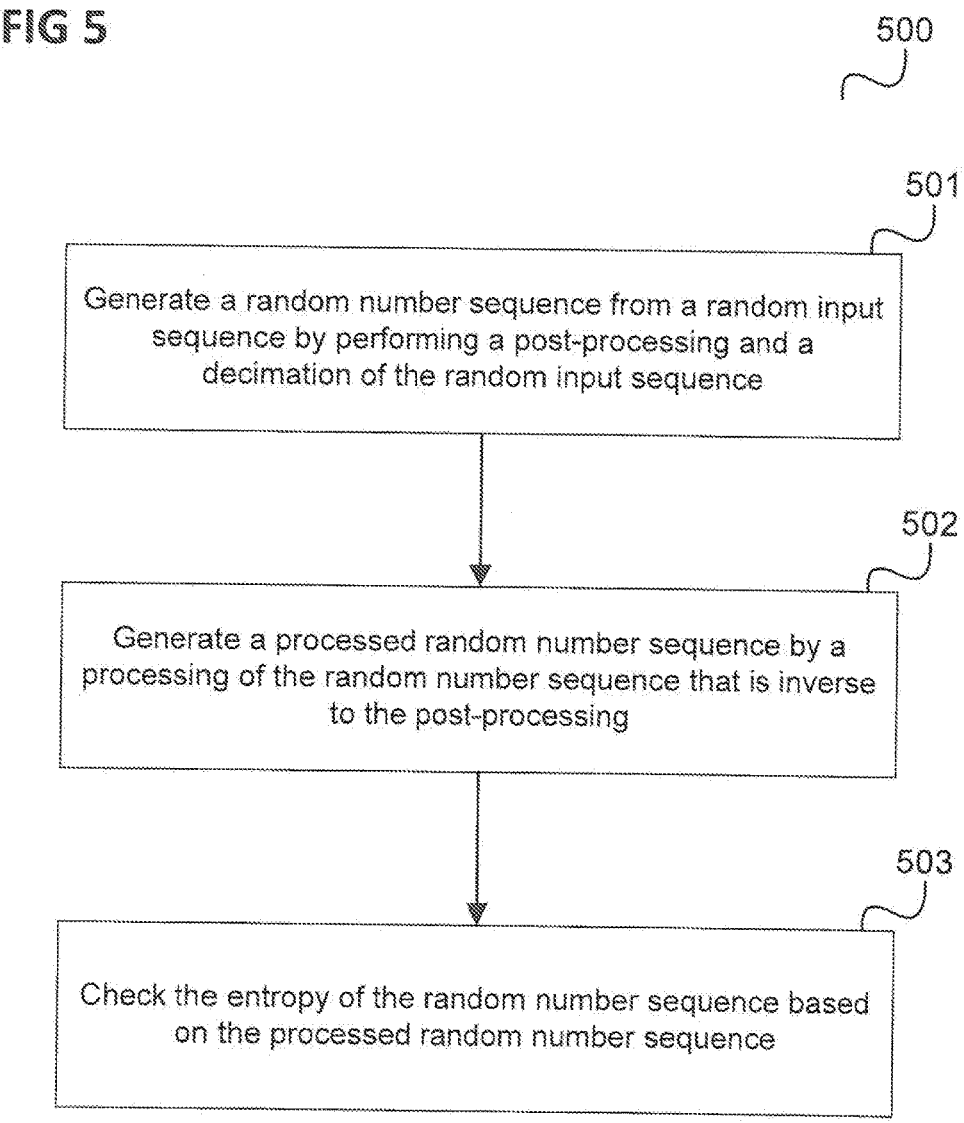
FIG. 5 shows a flow diagram.

According to one embodiment, a method for checking the entropy of a random number as illustrated in FIG. 5 is provided.

FIG. 5 shows a flow diagram 500.

In 501, a random number sequence is generated from a random input sequence by performing a post-processing and a decimation of the random input sequence.

In 502, a processed random number sequence is generated by a processing of the random number sequence that is inverse to the post-processing.

In 503, the entropy of the random number sequence is checked based on the processed random number sequence.

It should be noted that embodiments described in context with the arrangement 400 of FIG. 4 are analogously valid for the method as illustrated in FIG. 5 and vice versa.

In the following, embodiments are shown in more detail.

Figure 6:
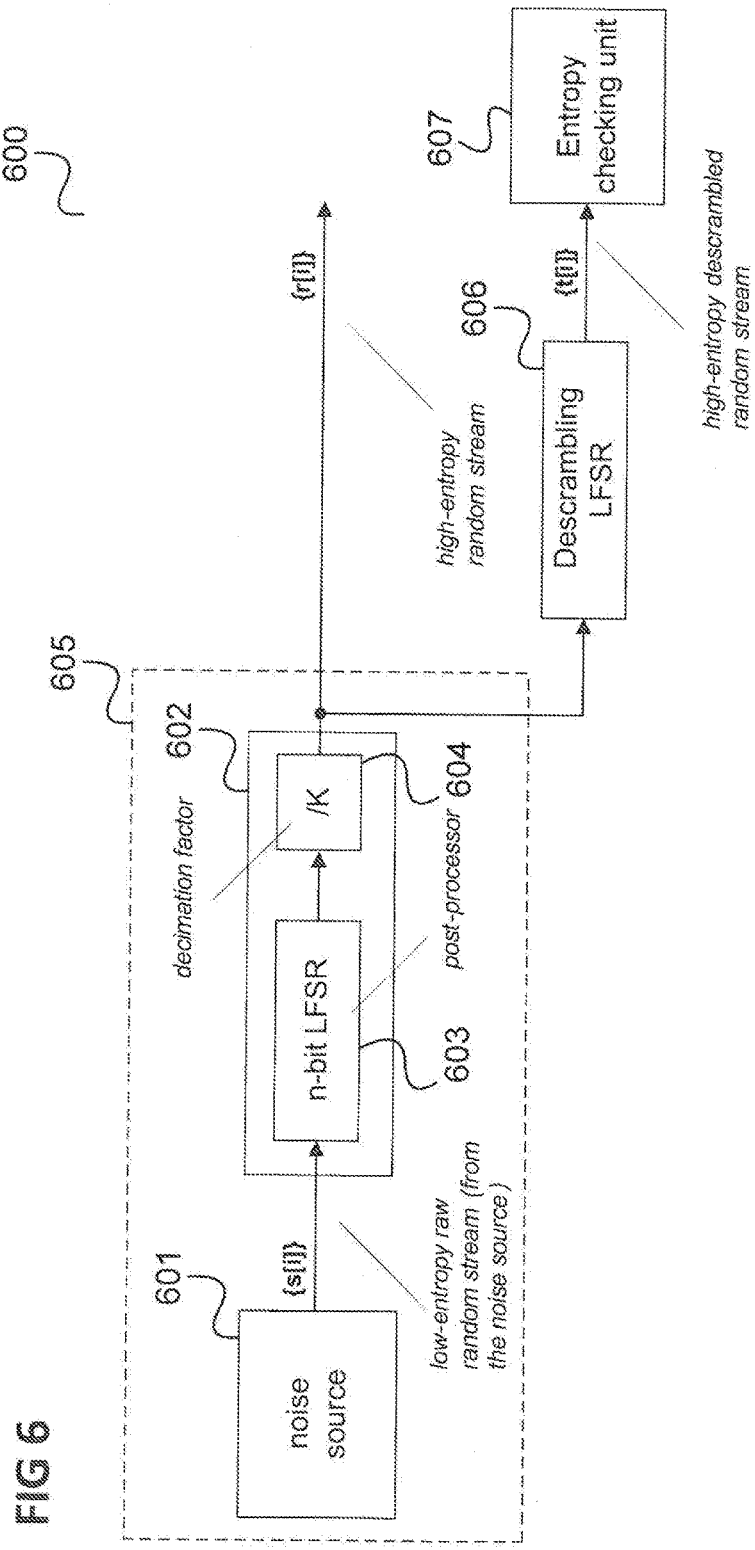
FIG. 6 shows an example of an arrangement for checking the entropy of a random number sequence according to an embodiment.

FIG. 6 shows an example of an arrangement for checking the entropy of a random number sequence 600 according to an embodiment.

The arrangement 600 includes a memory-less or short-memory noise source 601 which provides a digitized noise signal {s[i]}, i.e. a sequence of random digital values. For example, the noise source 601 corresponds to the noise source 201 together with the digitization unit 202.

The digitized noise signal {s[i]} is fed to a post-processor 602 which includes an n-bit linear feedback shift register (LFSR) 603, with for example the structure of the linear feedback shift register 305 described with reference to FIG. 3. The decimation, i.e. the compression according to compression factor K is represented by a decimation block 604. The compression factor K is for example a power of 2, e.g. 4, such that for every 4 bits input to the shift register 603, 1 output bit is extracted. For example, the word-length N may be 1 such that the post-processor 602 bit-wise outputs random bits and the output line of the post-processor 602 is a single-bit line.

The noise source 601 and the post-processor are for example part of a random number generator 605, e.g. arranged on an electronic device such as a chip card.

The output of the post-processor 602 (which is also the output of the random number generator 605) is the random number sequence (or random number stream) {r[i]} which may be used by other components, e.g. a processor or co-processor as explained with reference to FIG. 1, and whose entropy is in this example to be checked.

The checking of the entropy may for example be carried out for a device including the random number generator 605 after it has been manufactured and for example before it is in operation (e.g. before the random number sequence {r[i]} is used for, e.g., cryptographic purposes. For example, after a certain number of devices (e.g. chip cards), each containing a random number generator 605 have been manufactured, some of them may be tested with respect to the entropy of the generated random number sequence.

For the checking of the entropy of the generated random number sequence, the output stream {r[i]} is processed by a descrambling linear feedback shift register 606 which has (assuming that K is a power of 2) the same polynomial as the post-processing LFSR 603. The in descrambling LSRF may be in a self-synchronizing configuration and has the property to remove the pseudo-randomness introduced during compression by the post-processor 602. The output of the descrambling LFSR 606, a high-entropy descrambled random stream {t[i]}, is fed to an entropy checking unit 607 which determines its entropy by a conditional entropy test, e.g. according to equation (2) above.

A statistical test according to equation (2) for example includes building up a table of conditional probabilities as indicated in the right-hand sum of equation (2) for $x_1, \ldots, x_n$ wherein n goes to a certain maximum value (and is not to be confused with the n indicating the length of the LSFRs 301, 603). In other words, the term in the limes of equation (2) is determined for a certain value of n which is for example selected according to the compression factor and the desired accuracy of the entropy measure. For example, for a compression of 16, the value for n (also referred to as depth or condition depth) is chosen in the range of 20 to 22 which is typically still practically feasible.

In the example described above, where the random number generator 605 is tested after manufacturing, e.g. in a laboratory, the descrambling LFSR 606 and the entropy checking unit 607 may for example be implemented by a computer which receives the random number sequence {r[i]}.

The operation of the descrambling LFSR 606 can be seen to be based on a property of the maximum length sequences (i.e. sequences produced by LFSRs using a primitive polynomial). Namely, a power of 2 decimation of a maximum length sequence is just a shift version of the same sequence. Therefore, the descrambling LFSR 606 can reverse the free evolution (i.e. free-running) of the post-processing LFSR despite the decimation by block 604 and it produces a constant output if the input of the post-processing LFSR 602 consists of a constant bit stream (e.g. when the noise source 601 is switched off or fails).

It should be noted that if the compression K is not a power of 2, the descrambling LFSR does not have the same polynomial as the post-processor 602 but, using the proper polynomial, the above property still holds.

Further, it should be noted that for the above, the input stream does not need to be constant to have the descrambling LFSR 606 produce a constant output; it is sufficient that it consists of repetition of a constant K-bit sub-sequence.

Thus, the descrambled sequence NW can be used to test the entropy of the compressed sequence {r[i]} by applying a conditional entropy test with a depth n steps lower than what is needed if test is performed directly on {r[i]}.

Figure 7:
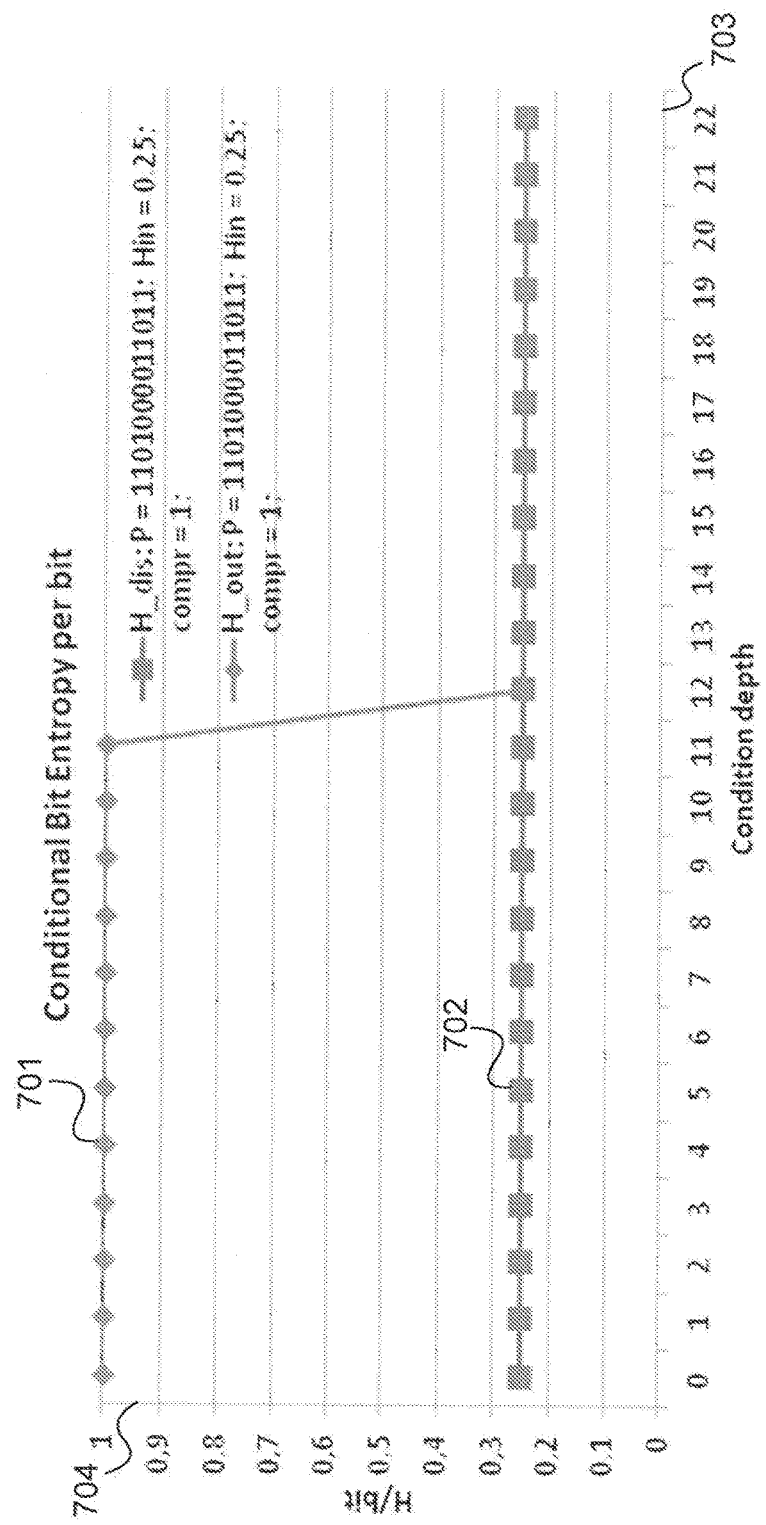
FIG. 7 shows the results of a numerical simulation over a $10^{10}$ bit sequence where a noise source with entropy 0.25 is post-processed with an 12-bit LFSR with no compression.

FIG. 7 shows the results of a numerical simulation over a $10^{10}$ bit sequence where a noise source with entropy H=0.25 is post-processed with an n=12 bit LFSR with no compression (K=1).

The result of a conditional entropy test being applied to {r[i]} is indicated by a first curve 701 and the result of a conditional entropy test being applied to the descrambled sequence {t[i]} is indicated by a second curve 702, wherein the depth increases from left to right along a depth axis 703 and the entropy as given out by the entropy test increases from bottom to top along an entropy axis 704.

As can be seen, after descrambling, the entropy test can detect immediately The correct source entropy (0.25) while a depth of 12 (the LFSR length) is needed if the output sequence {r[i]} is tested directly.

Figure 8:
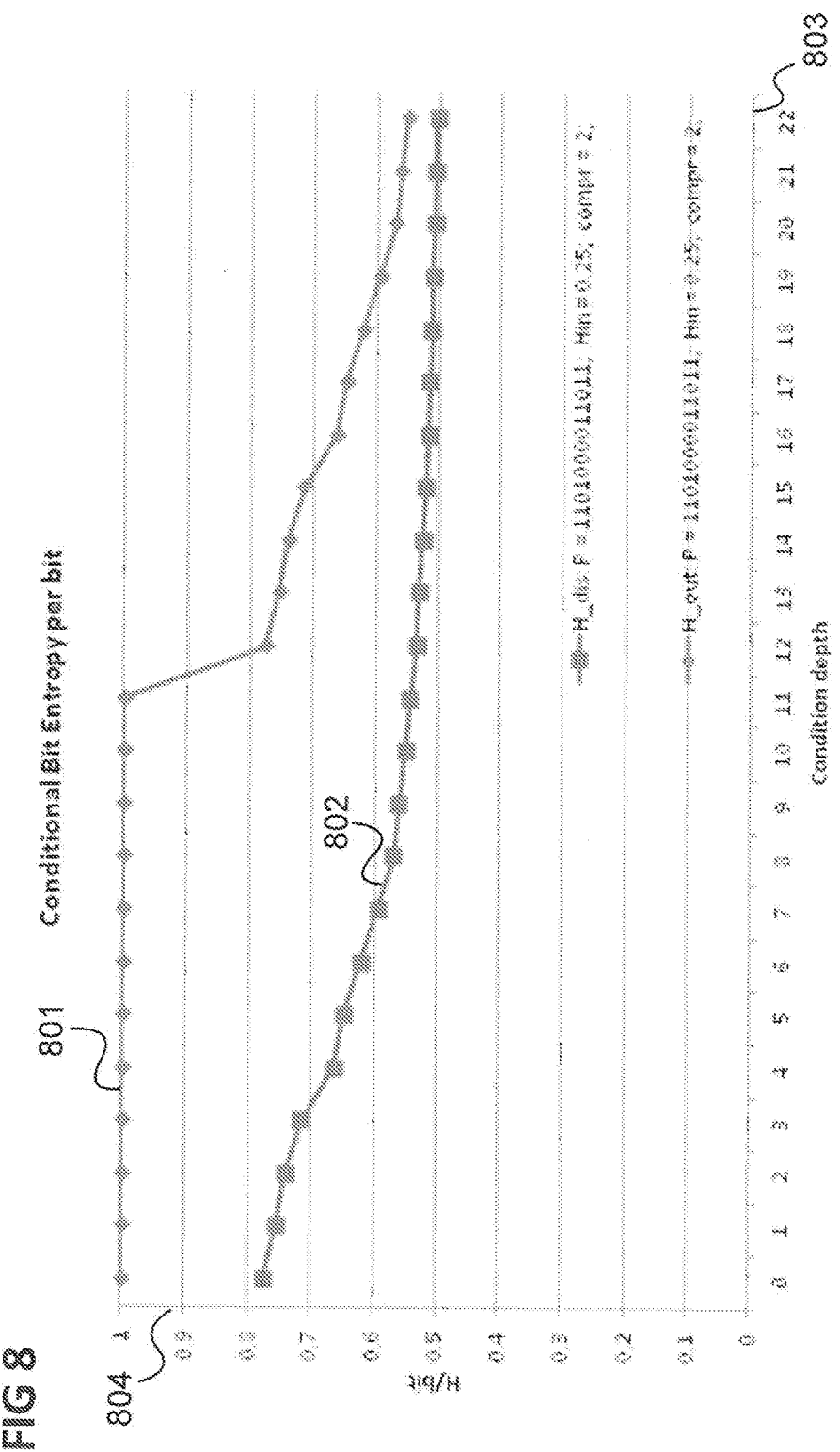
FIG. 8 shows the results of the numerical simulation with a compression of 2.

FIG. 8 shows the results of the numerical simulation with a compression of K=2.

As in FIG. 7, the result of a conditional entropy test being applied to {r[i]} is indicated by a first curve 801 and the result of a conditional entropy test being applied to the descrambled sequence {t[i]} is indicated by a second curve 802, wherein the depth increases from left to right along a depth axis 803 and the entropy as given out by the entropy test increases from bottom to top along an entropy axis 804.

As can be seen, in case a compression is applied (K=2 in this example), a similar result is obtained in simulation as in the case of FIG. 7: the estimated conditional entropy starts to converge immediately to the final value (approximately 2×0.25) in case of the descrambled sequence (second curve 802) while, for the output sequence, a depth of 12 must be reached to see a decrease of the estimation (first curve 801). The same holds for higher compression factors as can be seen in FIG. 9.

Figure 9:
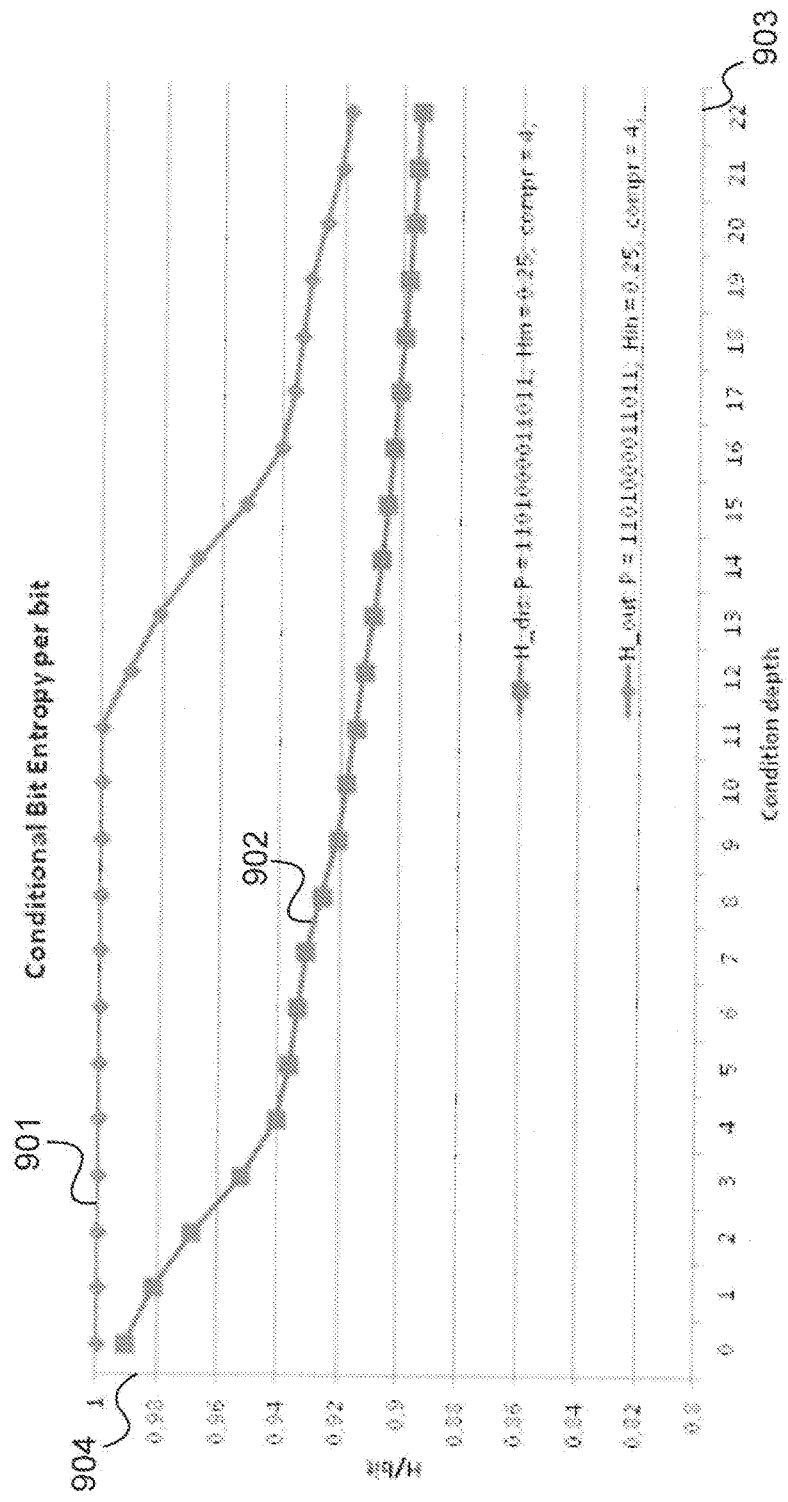
FIG. 9 shows the results of the numerical simulation with a compression of 4.

FIG. 9 shows the results of the numerical simulation with a compression of K=4.

As in FIG. 7 and FIG. 8, the result of a conditional entropy test being applied to {r[i]} is indicated by a first curve 901 and the result of a conditional entropy test being applied to the descrambled sequence {t[i]} is indicated by a second curve 902, wherein the depth increases from left to right along a depth axis 903 and the entropy as given out by the entropy test increases from bottom to top along an entropy axis 904.

Similarly as in the case of FIG. 8, the estimated conditional entropy starts to converge immediately to the final value in case of the descrambled sequence while, for the output sequence, a depth of 12 must be reached to see a decrease of the estimation.

It should be noted that, as can be seen in FIGS. 7 to 9, the conditional entropy estimate of the descrambled sequence {t[i]} is the n-step shifted version of the estimate done directly on the sequence {r[i]} (wherein n=12 in the above examples).

According to one embodiment, the descrambled sequence produced by the descrambling LFSR is used to implement a total failure test for the noise source 601 (TOT test). In fact, if the noise source output becomes constant (constant K-bit sub-sequences), this results in a constant sequence at the output of the descrambling LFSR 606. The TOT test may be performed by a non-transition detector as illustrated in FIG. 10.

Figure 10:
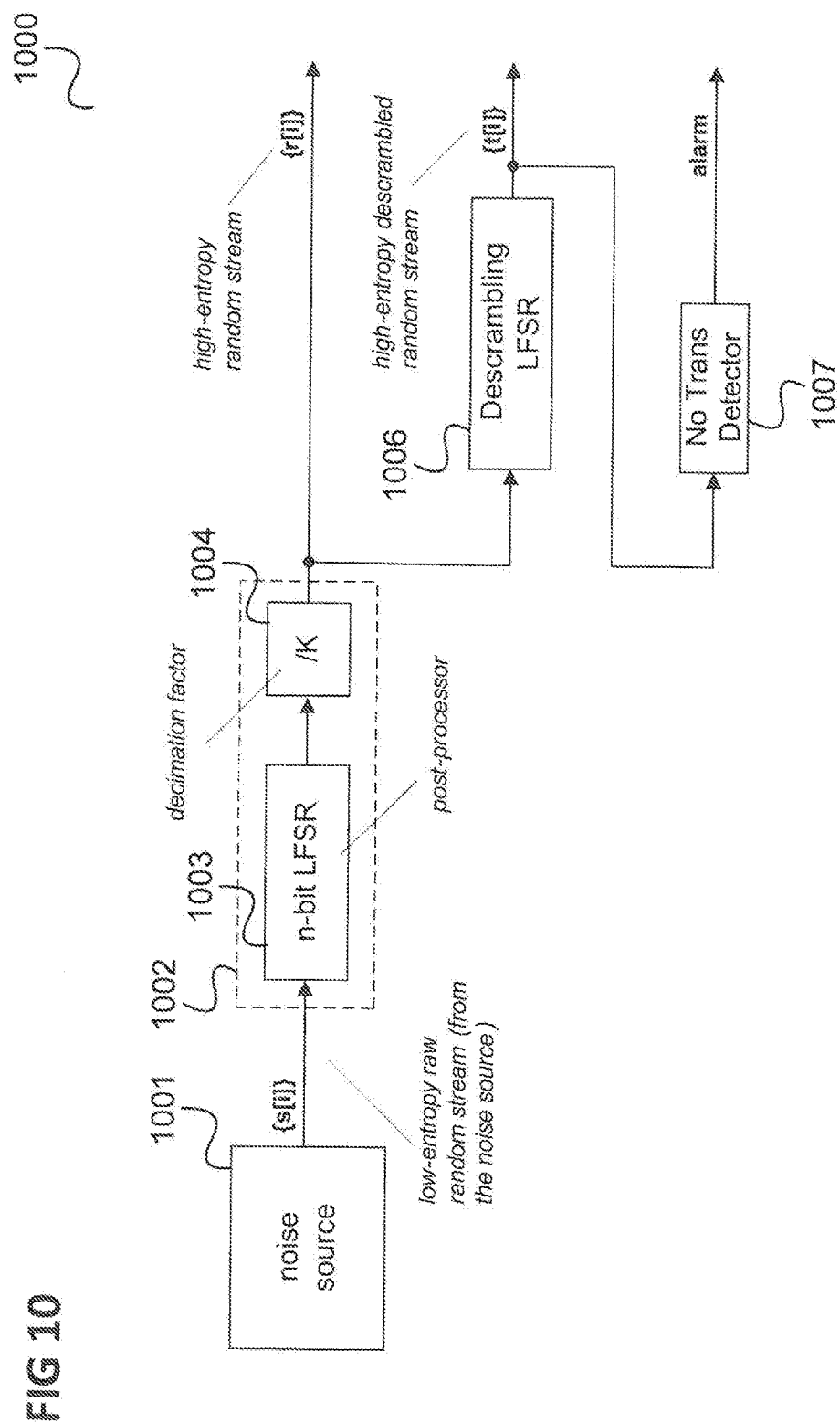
FIG. 10 shows an example of an arrangement for checking the entropy of a random number sequence according to a further embodiment.

FIG. 10 shows an example of an arrangement for checking the entropy of a random number sequence 1000 according to a further embodiment.

Similarly to the arrangement 600 of FIG. 6, the arrangement 1000 includes a noise source 1001, a post-processor 1002 and a descrambling LFSR 1006 operating as described above with reference to FIG. 6. The arrangement 1000 further includes a non-transition detector 1007 which receives the descrambled random stream as input and for example which counts if no transition occurs over a predetermined number of bits, e.g. over 64 consecutive bits of the test sequence, i.e. the descrambled random stream in this example. If no transition occurs over the predetermined number of bits, it triggers an alarm is triggered.

The arrangement 1000 may, for example without entropy checking unit, be implemented in a device such as a chip card such that it may be checked during operation of the device whether the noise source is operating correctly or has failed.

Further, according to one embodiment, the descrambled sequence {t[i]} can also be used to implement an integrity test of the post-processing LFSR: if the noise source output is forced to a constant value (constant K-bit sub-sequences) during the entropy test, this must result in a constant sequence after the descrambling. This can be used after manufacturing before the device is delivered with an external entropy checking unit or no transition detector but may also be implemented, e.g. with the architecture of FIG. 10, in the device itself such that the integrity of the post-processing LFSR can be checked by the device, e.g. to detect attacks on the device.

Figure 11:
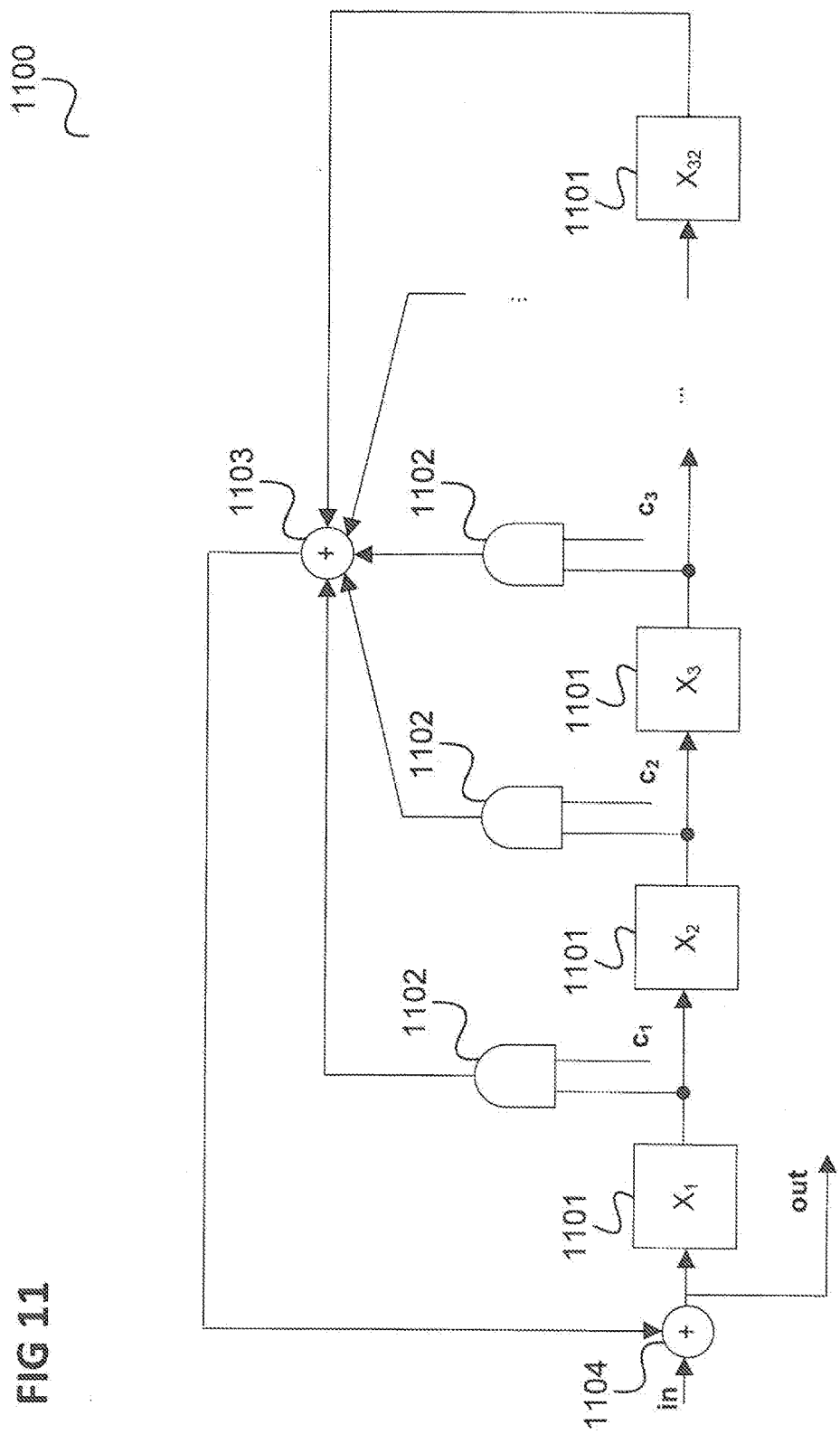
FIG. 11 shows a linear feedback shift register according to an embodiment.

The LFSR 305, 603 is for example a linear feedback shift register as shown in FIG. 11.

FIG. 11 shows a linear feedback shift register (LFSR) 1100 according to an embodiment.

The LFSR is a Fibonacci LFSR 1100 in self-synchronizing configuration. It includes a plurality of n=32 flip-flops 1101 in this example. the output of each flip-flop is connected via respective AND gate 1102 (except the rightmost flip-flop 1102, which is directly connected) to an n-input exclusive OR 1103 whose output is connected, together with the input of the descrambling LFSR 1100, to an exclusive OR 1104. The output of the exclusive OR 1104 is the input to the leftmost flip-flop 1101 as well as the output of the descrambling LFSR 1100.

Each AND gate 1102 receives, at its second input, a coefficient of the primitive polynomial according to which the LFSR should operate. Specifically, the AND gate 1102 connected to the output of the ith flip-flop (i=1, . . . , 32 in this example) receives the ith coefficient (i.e. the coefficient of $x^i$) of the polynomial).

As described above, a bit is for example output after a certain number of bits has been shifted into the LFSR 1100 to implement a certain compression.

Figure 12:
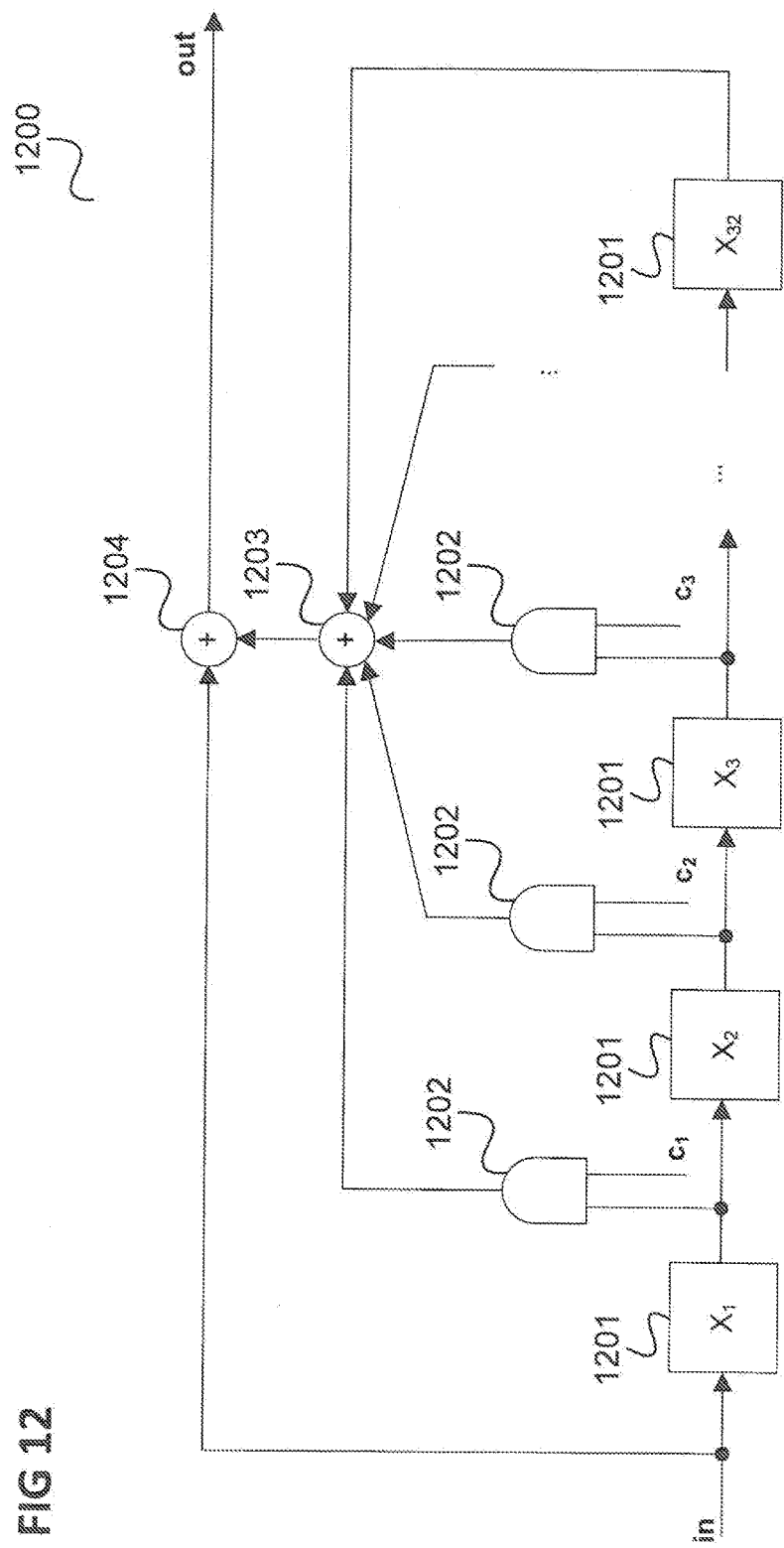
FIG. 12 shows an example of a descrambling LFSR.

FIG. 12 shows an example of a descrambling LFSR 1200.

The descrambling LFSR is a Fibonacci LFSR in self-synchronizing configuration. It includes a plurality of n=32 flip-flops 1201 in this example. the output of each flip-flop is connected via respective AND gate 1202 (except the rightmost flip-flop 1202, which is directly connected) to an n-input exclusive OR 1203 whose output is connected, together with the input of the descrambling LFSR 1200, to an exclusive OR 1204. The output of the exclusive OR 1204 is the output of the descrambling LFSR 1200. The input of the descrambling LFSR is connected to the first (leftmost) flip-flop 1201. Each AND gate 1202 receives, at its second input, a coefficient of the primitive polynomial according to which the LFSR should operate. Specifically, the AND gate 1202 connected to the output of the ith flip-flop (i=1, . . . , 32 in this example) receives the ith coefficient (i.e. the coefficient of $x^i$) of the polynomial).

When used as the descrambling LFSR 606, the coefficients c1, c2, . . . c31 are set to the polynomial coefficients of the post-processing LFSR 603.

It should be noted that the descrambling LFSR 1200 can be used as descrambling LFSR 606 for the arrangement 600 of FIG. 6 for any power of 2 as compression of the post-processor 602.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. An arrangement for checking the entropy of a random number sequence comprising:
   a random source configured to provide a random input sequence;
   a post-processing circuit configured to receive the random input sequence and to generate a random number sequence from the random input sequence by performing a post-processing and a decimation of the random input sequence;
   an inverse post-processing circuit configured to receive the random number sequence from the post-processing circuit and to generate a processed random number sequence by a processing of the random number sequence that is inverse to the post-processing performed by the post-processing circuit; and
   an entropy checker configured to check the entropy of the random number sequence based on the processed random number sequence.

2. The arrangement of claim 1,
   wherein the decimation includes outputting a first number of post-processed bits for every second number of bits of the random input sequence input into the post-processing circuit.

3. The arrangement of claim 1,
wherein the decimation is a compression of the random input sequence by a compression factor equal to a power of 2.

4. The arrangement of claim 1,
wherein the post-processing circuit comprises a linear feedback shift register and the post-processing is a processing of the random input sequence by the linear feedback shift register.

5. The arrangement of claim 4,
wherein the decimation includes outputting a first number of bits stored in the linear feedback shift register each time after a second number of bits of the random input sequence have been input into the linear feedback shift register.

6. The arrangement of claim 4,
wherein the inverse post-processing circuit comprises a further linear feedback shift register and the processing of the random number sequence that is inverse to the post-processing performed by the post-processing circuit is a processing of the random number sequence by the further linear feedback shift register.

7. The arrangement of claim 6,
wherein the linear feedback shift register and the further linear feedback shift register are configured according to the same primitive polynomial.

8. The arrangement of claim 1,
wherein the random source comprises a noise source and a digitization unit configured to generate the random input sequence by digitizing noise output by the noise source.

9. The arrangement of claim 1,
wherein the entropy checker is configured to detect whether the entropy of the random number sequence is zero and, if it has detected that the entropy of the processed random number sequence is zero, to output a signal indicating that the random source has failed.

10. The arrangement of claim 1,
wherein the entropy checker is configured to detect whether the entropy of the processed random number sequence is zero by detecting whether the processed random number sequence is constant.

11. The arrangement of claim 1, further comprising:
a controller configured to check the integrity of the post-processing circuit by checking whether the processed random number sequence is constant in response to a constant random input sequence.

12. The arrangement of claim 1,
wherein the entropy checker is configured to measure the entropy of the random number sequence by measuring the entropy of the processed random number sequence.

13. The arrangement of claim 12,
wherein the entropy checker is configured to measure the entropy of the processed random number sequence by applying a statistical test to the processed random number sequence.

14. A processing device, comprising;
an arrangement for checking the entropy of a random number sequence, comprising:
  a random source configured to provide a random input sequence;
  a post-processing circuit configured to receive the random input sequence and to generate a random number sequence from the random input sequence by performing a post-processing and a decimation of the random input sequence;
  an inverse post-processing circuit configured to receive the random number sequence from the post-processing circuit and to generate a processed random number sequence by a processing of the random number sequence that is inverse to the post-processing performed by the post-processing circuit; and
  an entropy checker configured to check the entropy of the random number sequence based on the processed random number sequence.

15. The processing device of claim 14,
wherein the processing device is a chip card.

16. A method for checking the entropy of a random number sequence comprising:
  generating a random number sequence from a random input sequence by performing a post-processing and a decimation of the random input sequence;
  generating a processed random number sequence by a processing of the random number sequence that is inverse to the post-processing; and
  checking the entropy of the random number sequence based on the processed random number sequence.

17. The method of claim 16,
wherein the decimation includes outputting a first number of post-processed bits for every second number of bits of the random input sequence input into the post-processing circuit.

18. The method of claim 16,
wherein the decimation is a compression of the random input sequence by a compression factor equal to a power of 2.

19. The method of claim 16, further comprising:
checking the integrity of the post-processing circuit by checking whether the processed random number sequence is constant in response to a constant random input sequence.

20. The method of claim 16,
wherein the method is performed by a chip card.

* * * * *